United States Patent
Panwar et al.

[11] Patent Number: 5,880,978
[45] Date of Patent: Mar. 9, 1999

[54] METHOD AND APPARATUS FOR CREATING AN OUTPUT VECTOR FROM AN INPUT VECTOR

[75] Inventors: Ramesh Kumar Panwar, Santa Clara; Ralph Portillo, Mountain View; Naveen Krishnamurthy, Sunnyvale, all of Calif.

[73] Assignee: Intel Corporation, Santa Clara, Calif.

[21] Appl. No.: 700,008

[22] Filed: Aug. 20, 1996

[51] Int. Cl.$^6$ .................. G06F 7/00; G06F 15/00
[52] U.S. Cl. ...................................................... 364/715.1
[58] Field of Search .................... 364/715.09, 715.1, 364/715.11

[56] References Cited

U.S. PATENT DOCUMENTS

| | | | |
|---|---|---|---|
| 4,748,575 | 5/1988 | Ashkin et al. | 364/715.1 |
| 5,241,490 | 8/1993 | Poon | 364/715.1 |
| 5,345,405 | 9/1994 | Walsh et al. | 364/715.1 |
| 5,471,410 | 11/1995 | Bailey et al. | 364/715.1 |

*Primary Examiner*—Emmanuel L. Moise
*Attorney, Agent, or Firm*—Arnold White & Durkee P.c.

[57] ABSTRACT

A method for creating an output vector Z(n-1:0) from a first vector X(n-1:0) and a second vector Y(n-1:0). The second vector Y(n-1:0) is a complement of the first vector X(n-1:0). The method subdivides X into a lower-order subvector XL(m-1:0) and a higher-order subvector XH(n-1:m). If a first 1 exists in position k in XL, then Z(k) is set to 0 and all other bits in Z(m-1:0) are set to 1. If a first 1 does not exist in XL, then all bits in Z(m-1:0) are set to 1. The method also determines if a 1 exists in XL. If a 1 exists in XL, then Z(n-1:m) is masked.

26 Claims, 4 Drawing Sheets

METHOD AND APPARATUS FOR CREATING AN OUTPUT VECTOR FROM AN INPUT VECTOR

1. BACKGROUND OF THE INVENTION

This invention relates in general to computer algorithms and an apparatus for rapidly performing same. More particularly, this invention relates to a method and an apparatus for creating an output vector from a first vector and a second vector, the second vector being a complement of the first vector. This method is particularly useful for rapidly finding the first 1 in a long vector.

As is well known in the art, binary numbers are the native tongue of computers. The transistor, the basic building block of most modern microprocessors, can create binary information: a 1 if current passes through, or a 0 if current doesn't. From these 1s and 0s, which are called bits, a computer can create any number, provided it has enough transistors grouped together to hold the 1s and 0s required. A group of 1s and 0s is commonly known as a vector. For example, a vector $X(n-1:0)$ has n storage locations numbered from 0 to n−1. The first bit in the vector $X(n-1:0)$ is $X(0)$ while the last bit is $X(n-1)$. When referring to an entire vector $X(n-1:0)$, a short-hand notation X is often used by those skilled in the art.

Consider a vector X' having a length n of 8 and equal to 01101110. The rightmost bit $X'(0)$, in this case 0, is the least significant bit. The left most bit $X'(7)$, in this case 0, is the most significant bit. If it is desired to find the first 1 in X', one could first look at the least significant bit, $X'(0)$. Because $X'(0)$ is 0, one could then look at the next higher-order bit, $X'(1)$. In this case, $X'(1)$ is 1. Thus, $X'(1)$ is "the first 1 found in X'." While in this simple example the first 1 in X' was found in a relatively small number of steps, much more complicated examples would require many additional time-consuming steps.

It may be desired to represent the first 1 found in X in another vector Z'. In this case, Z' could be set equal to 1111101 where the 0 in $Z'(1)$ indicates the position of the first 1 found in X'.

In modern microprocessors, it may be necessary to find the first 1 in a long vector. For example, a resource scheduler or a resource allocator may need to find the first 1 in a vector $X(n-1:0)$ that represents the availability of n resources. A 1 in such a vector, which will be referred to as a resource vector, may represent that a particular resource is available, while a 0 may represent that the resource is busy. These resources may include floating point registers and general registers for out-of-order instruction execution. Because of the large number of resources in modern microprocessors, the length n of a resource vector may be as great as 64. It is likely that future microprocessors will have even more resources and will utilize even larger resource vectors.

It may also be necessary to find the first 1 in a long vector when aligning complex instruction set computer (CISC) instructions. An instruction alignment unit may search a long vector that marks the end bytes of CISC instructions. Thus, the location of the end byte of a particular CISC instruction may be found by finding the first 1 in that long vector.

Because of the ever-increasing clock speeds of modern microprocessors, certain microprocessor functions, such as scheduling and allocating resources, need to be performed more rapidly than ever before. Such functions are preferably performed in less than a single microprocessor clock cycle.

Conventional methods for finding the first 1 in a long vector utilize AND gates. As is known in the art, an AND gate is a multiple-input-single-output device which realizes the logical function AND. These conventional methods require multiple levels of AND gates, i.e., the output of a first AND gate is coupled to an input of a second AND gate and so on. Each level of AND gates induces a delay equal to the switching speed of the AND gate. Modern AND gates have extremely fast switching speeds. However, the multiple levels of AND gates required for finding the first 1 in a long vector using conventional methods do not allow scheduling or allocating resources in a single clock cycle of a modern microprocessor. This deficiency is also due in part to the fact that AND gates are relatively slow when implemented in domino logic.

Domino logic is known by those skilled in the art as a modification of conventional clocked CMOS logic. Domino logic allows a single clock to pre-charge and evaluate a cascaded set of dynamic logic blocks. In a cascaded set of logic blocks, each stage evaluates and causes the next stage to evaluate—in the same way a line of dominos fall. Any number of logic stages may be cascaded, provided that the sequence can evaluate within the evaluate clock phase.

Another conventional method for finding the first 1 in a vector does not involve the use of AND gates. FIG. 1 shows a diagram of a prior art Find First One Block. This block contains a plurality of domino OR gates. As shown in FIG. 1, vector $X(n-1:0)$ is input into the block. Likewise, vector $Y(n-1:0)$ is input into the block. Y is the complement of X. For binary numbers, the complement of 1 is 0. Similarly, the complement of 0 is 1. For example, if a vector X' has a length n of 8 and is set equal to 01101110, then the complement of X' is 10010001. The output of the block is vector Z.

In this prior art method, $Y(0)$ is directly coupled to $Z(0)$. For k equals 1 to n−1, $X(k-1:0)$ and $Y(k)$ are input into a k+1 input OR gate. The output of each k+1 input OR gate is output into $Z(k)$.

While this prior art method can find the first 1 more rapidly than the above described method using AND gates, it could not efficiently find the first 1 in long vectors. As can be seen in FIG. 1, there is a large fanout of $X(0)$ because it is connected to n−1 OR gates. Large fanouts typically increase the load capacitance and slow down the previous driving gate in the domino chain. In addition, as the number of inputs into an OR gate increases, the diffusion capacitance increases and the output speed decreases. Finally, the surface area required to implement this prior art block is large due to the significant transistor count. The large surface area increases device costs. Further, the large surface area increases delays and slows down the block. As is known by those skilled in the art, delays due to wire lengths are becoming comparable to more dominant gate delays as process geometries shrink.

Thus, a need exists for a method and apparatus for efficiently finding the first 1 in a long vector within a single microprocessor clock cycle.

2. SUMMARY OF THE INVENTION

The invention relates to a method for creating an output vector $Z(n-1:0)$ from a first vector $X(n-1:0)$ and a second vector $Y(n-1:0)$. The second vector $Y(n-1:0)$ is a complement of the first vector $X(n-1:0)$. The method subdivides X into a lower-order subvector $XL(m-1:0)$ and a higher-order subvector $XH(n-1:m)$. If a first 1 exists in position k in XL, then $Z(k)$ is set to 0 and all other bits in $Z(m-1:0)$ are set to 1. If a first 1 does not exist in XL, then all bits in $Z(m-1:0)$ are set to 1. The method also determines if a 1 exists in XL. If a 1 exists in XL, then $Z(n-1:m)$ is masked.

3. BRIEF DESCRIPTION OF THE DRAWINGS

4. DETAILED DESCRIPTION OF SPECIFIC EMBODIMENTS

Figure 1:
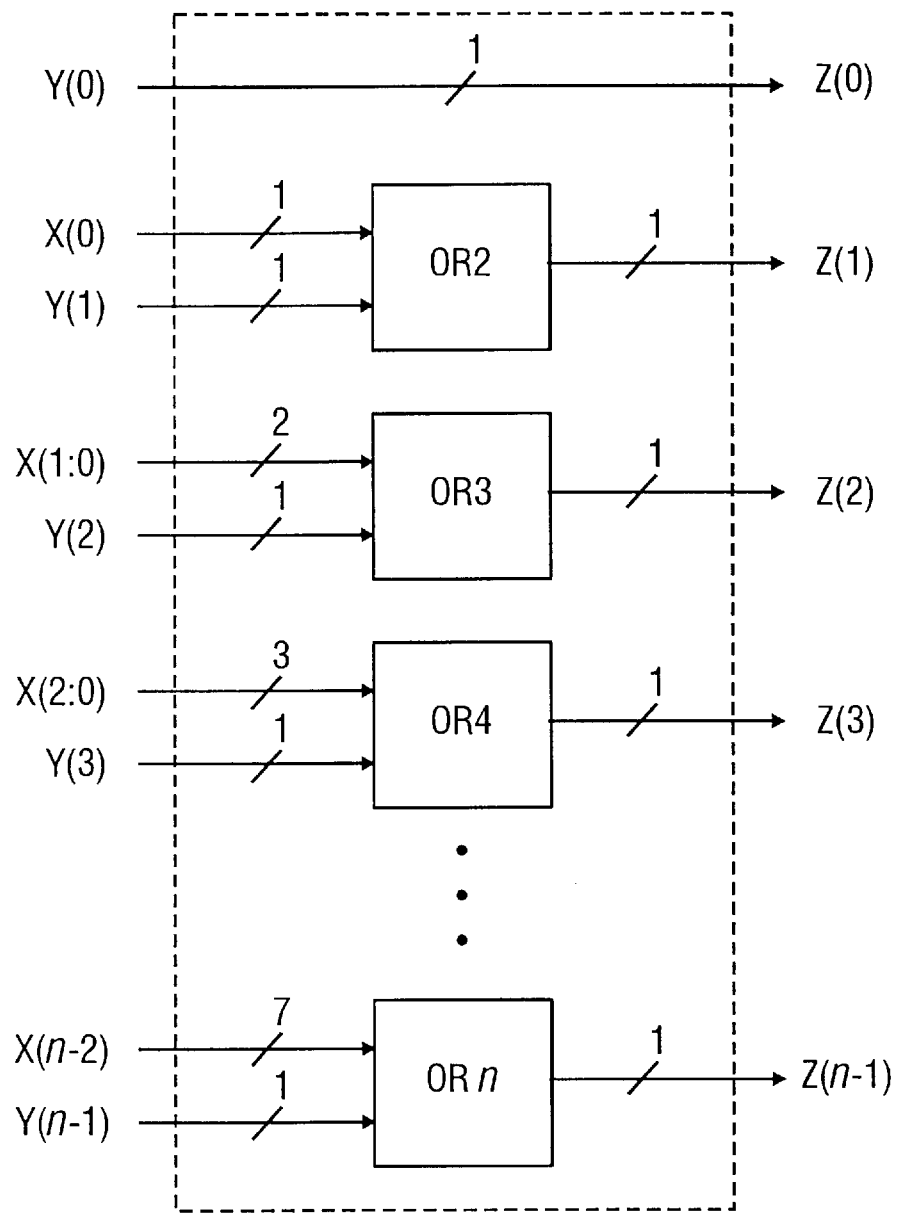
FIG. 1 is a high level block diagram of a prior art Find First One block.
Figure 2:
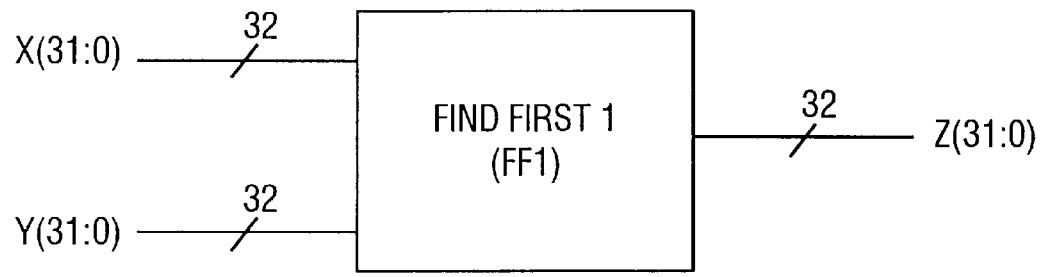
FIG. 2 is a high level block diagram of a Find First One block.

As shown in FIG. 2, vector X is input into the Find First One block, referred to as FF1. Likewise, vector Y is input into FF1. Y is typically the complement of X. The output of FF1 is vector Z.

Figure 3:
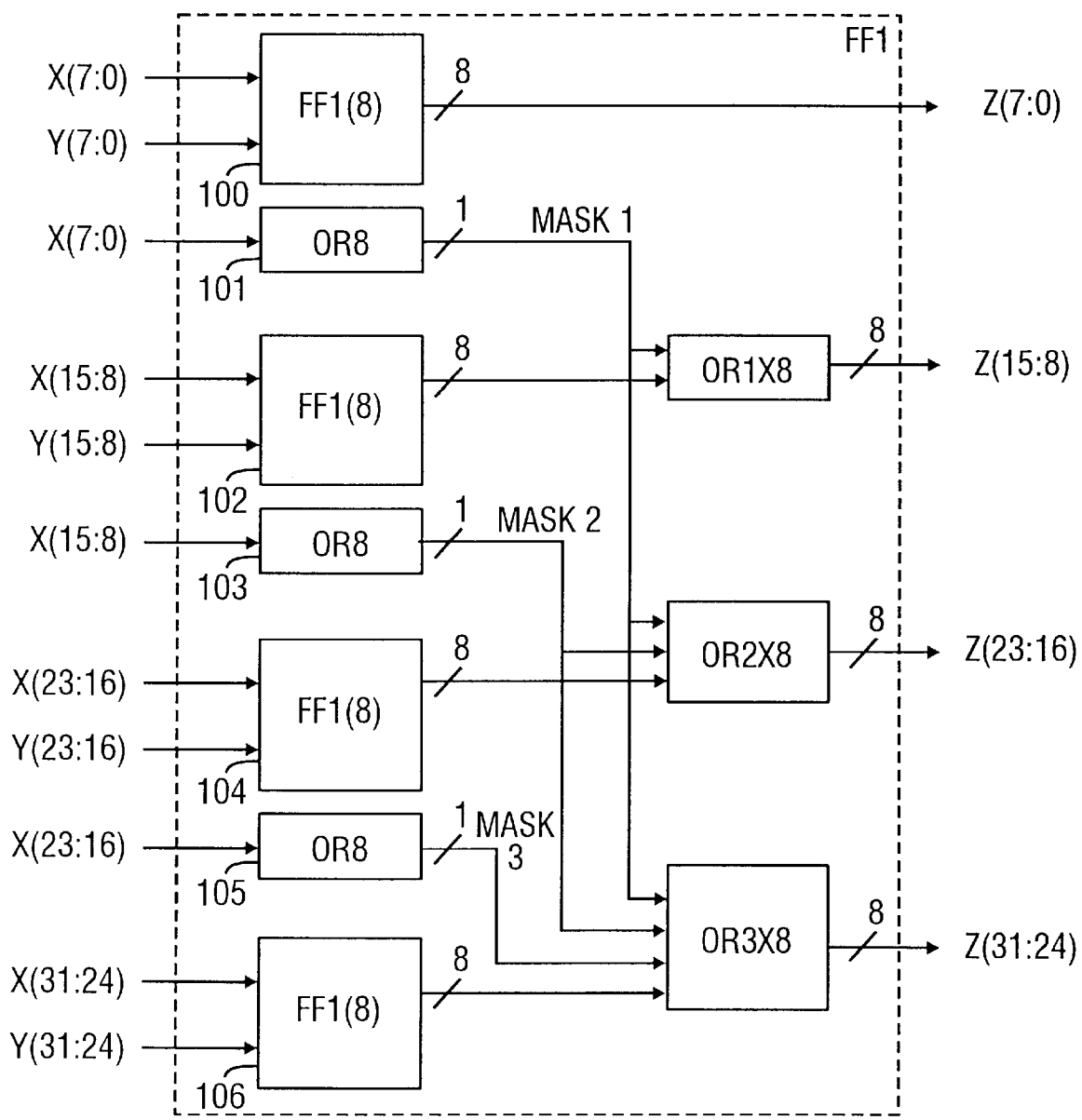
FIG. 3 is a more detailed block diagram of the Find First One block of FIG. 2.

FIG. 3 shows a more detailed diagram of FF1. A subvector of X consisting of X(7:0) is input into Find First 1 of Eight Block 100, referred to as FF1(8) 100. Likewise, the complement of X(7:0), namely Y(7:0), is also input into FF1(8) 100. A subvector of Z consisting of Z(7:0) is output from FF1(8) 100.

Figure 4:
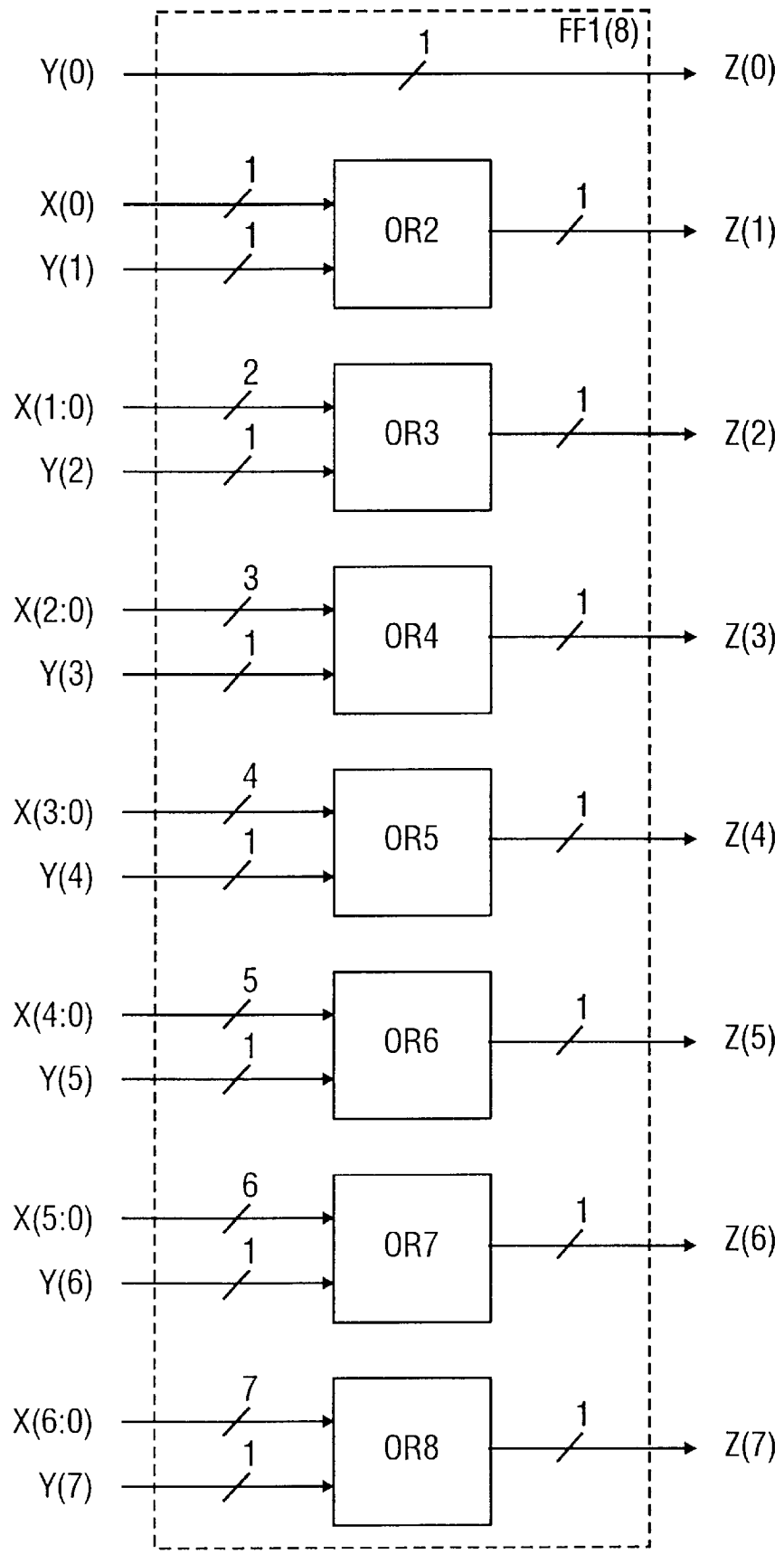
FIG. 4 is a block diagram of a Find First 1 of Eight block.

FIG. 4 shows a detailed diagram of FF1(8) 100. FF1(8) contains a plurality of conventional OR gates. Y(0) is directly coupled to Z(0). For k equals 1 to 7, X(k-1:0) and Y(k) are input into a k+1 input OR gate. The output of each conventional k+1 input OR gate is output into Z(k).

Referring again to FIG. 3, a X(7:0) is input into a conventional 8 input OR gate 101. This 8 input OR gate 101 will be referred to as a masking OR gate 101. The output of the masking OR gate 101 will be referred to as Mask 1. Mask 1 will be used to mask, i.e., set to 1, the higher-order bits in Z if a 1 is found in X(7:0).

Figure 5:
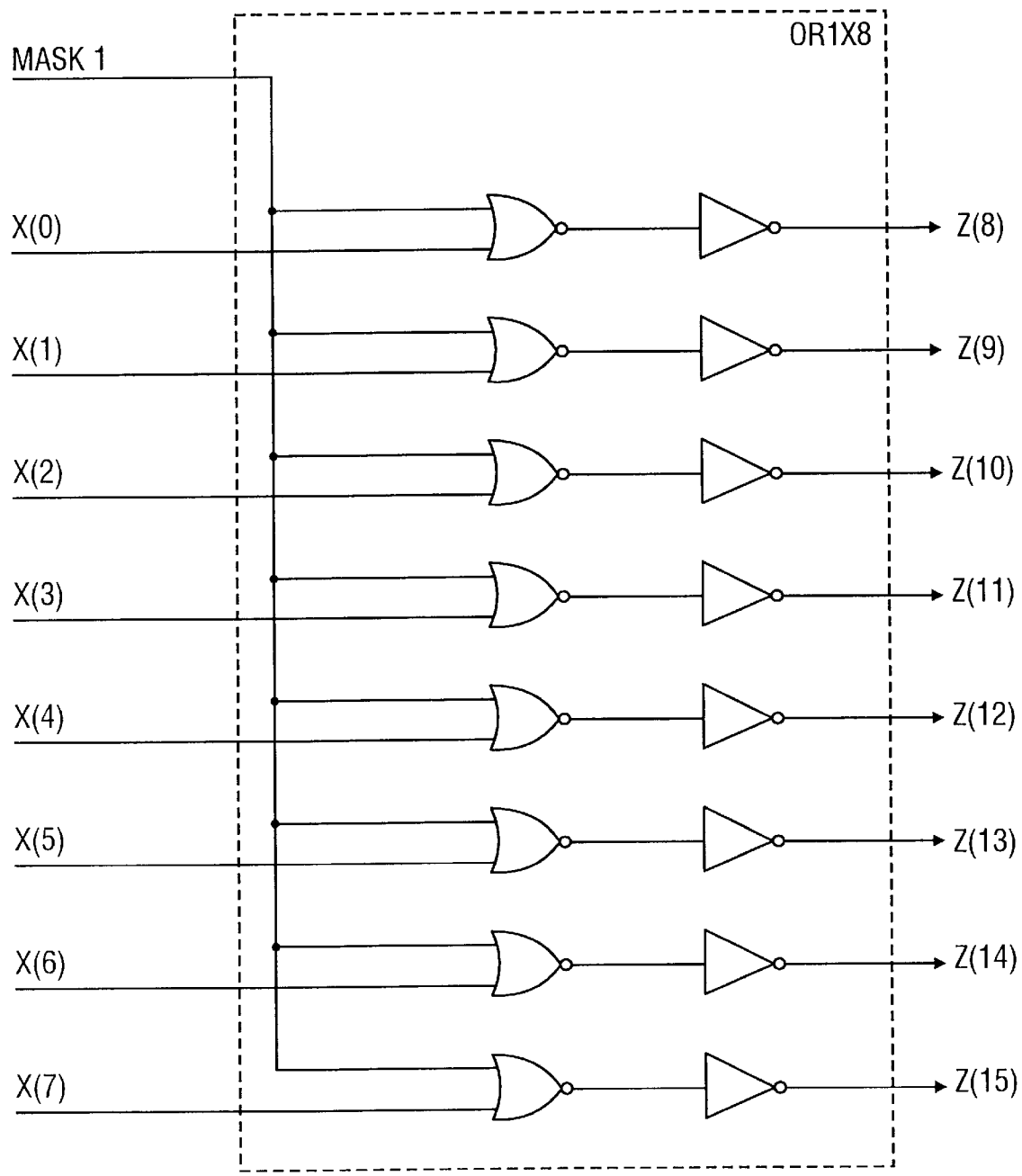
FIG. 5 is a more detailed diagram of the 1×8 OR gate of FIG. 1.

X(15:8) and Y(15:8) are input into FF1(8) 102. FF1(8) 102 is similar to FF1(8) 100. The outputs of FF1(8)102, which will be referred to as an intermediate vector 1, are input into a conventional 1×8 OR gate. Mask 1 is also input into the 1×8 OR gate. The 1×8 OR gate will be referred to as a combining OR gate. The combining OR gate performs the logical operation OR on each output of FF1(8) 102 with Mask 1. For example, if the output of FF1(8) 102 is 10101010 and Mask 1 is 1, then the output of the combining OR gate would be 11111111. The outputs of the combining OR gate are coupled to Z(15:8). While many embodiments of 1×8 OR gates are known in the art, one embodiment that may be optimal in certain circumstances is shown in FIG. 5.

Referring again to FIG. 3, subvector X(15:8) is input into a conventional 8 input OR gate 103. The output of the 8 input OR gate 103 will be referred to as Mask 2. X(23:16) and Y(23:16) are input into FF1(8) 104. The outputs of FF1(8) 104 are input into a 2×8 OR gate along with Mask 1 and Mask 2. The 2×8 OR gate masks each output of FF1(8) 104 if either Mask 1 or Mask 2 is 1. The outputs of the 2×8 OR gate are coupled to Z(23:16).

X(23:16) is input into a conventional 8 input OR gate 105. The output of the 8 input OR gate 105 is referred to as Mask 3. X(31:24) and Y(31:24) are input into FF1(8) 106. The outputs of FF1(8) 106 are input into a 3×8 OR gate along with Mask 1, Mask 2, and Mask 3. The 3×8 OR gate masks off each output of FF1(8) 106 if either Mask 1, Mask 2, or Mask 3 is 1. The outputs of the 3×8 OR gate are coupled to Z(31:24).

As shown in FIG. 2, the lengths of X and Y are equal to the length n of Z, namely 32. Under certain circumstances the length n of Z will be different than the lengths of X & Y. For example, it may be desired to find the first 1 in the subvector X(16:31). These higher-order bits of X may represent a certain type of resources, such as general registers, that need to be allocated. However, typically the lengths of X and Z will be the same.

The length n of Z may be increased or decreased as needed. For example, the length n of Z may be increased to 40 by adding an additional FF1(8) and an additional 8 input OR gate. The outputs of the additional FF1(8) block and the output of the additional 8 input OR gate would be input into an additional 4×8 OR gate. Thus, the additional 4×8 OR gate would OR the outputs of the FF1(8) with the four Masks. Alternatively, the length n of Z may be increased by increasing the widths of the FF1(8) blocks and OR gates. For example, the widths could be increased from 8 to 12 or more bits.

The above OR gates are conventional. The OR gates can be anything from relays with their slow on and off switching speed to modern off-the-shelf integrated circuit transistor switches with their extremely fast switching speed. In addition, the OR gates may be included on a very large scale integrated circuit such as an application specific device or a microprocessor. Further, the OR gates may be constructed using any conventional technology such as, but not limited to, transistor-transistor logic (TTL), complementary metal-oxide semiconductor (CMOS), emitter-coupled logic (ECL), and integrated injection logic ($I^2L$). In addition, the logical OR functions could be performed by computer program operating on a general purpose computer such as a personal computer.

While specific embodiments are described above, it will be apparent to those of ordinary skill having the benefit of this disclosure that other modifications and changes in addition to the examples discussed above may be made by those skilled in the art without departing from the spirit and scope of the invention.

5. REMARKS

One of the advantages of the invention is that it breaks down long vectors into more manageable subvectors. As discussed above, FF1 creates an output vector Z(n-1:0) from a first vector X(n-1:0) and a second vector Y(n-1:0). FF1 subdivides X into at least a lower-order subvector XL(m-1:0) and a higher-order subvector XH(n-1:m). The lengths of XL and XH may or may not be equal. In addition, there may be one or more higher-order subvectors. By dividing X into XL and XH, X is broken down into more manageable subvectors. Thus, multiple FF1(8) blocks can rapidly perform the required logic operations on XL and XH possibly using domino logic. The results of the logic operations on XL performed by FF1(8) are coupled to Z(m-1:0). The results of the logic operations on XH performed by FF1(8) are masked if a 1 exists in any of the lower-order subvectors. Otherwise, these results are transferred to Z(n-1:m).

Another primary advantage of this invention is that it finds the first 1 in a long vector rapidly. The speed of finding the first 1 is reduced by the use of OR gates. As is well known in the art, OR gates are more efficiently dominoed than AND gates. The speed of finding the first 1 in a longer vector is further reduced by minimizing the level of OR gates. For any vector length n, the first 1 can be found by utilizing only two levels of OR gates. Therefore, resources in modern microprocessors may be allocated and scheduled in a single clock cycle.

It will be appreciated by those of ordinary skill having the benefit of this disclosure that the illustrative embodiments described above are capable of numerous variations without departing from the scope and spirit of the invention. For example, while OR gates have been discussed, combinations of logical elements such as a NOR gate followed by an inverter may also produce a result within the scope of this invention. Accordingly, the exclusive rights sought to be patented are as described in the claims below.

What is claimed is:

1. An automated machine implemented method for creating signals representing an output vector $Z(n-1:0)$ from signals representing a first vector $X(n-1:0)$, n being a positive integer, the method comprising:

(a) subdividing X into signals representing a lower-order subvector $XL(m-1:0)$ and a higher-order subvector $XH(n-1:m)$;

(b) if a signal representing a first 1 exists in a bit k in XL, then setting the signal representing $Z(k)$ to 0 and setting the signals representing all other bits in $Z(m-1:0)$ to 1;

(c) if a signal representing a first 1 does not exist in XL, then setting the signals representing all bits in $Z(m-1:0)$ to 1;

(d) determining if any of the signals representing the bits in XL are 1; and (e) if a signal representing a bit in XL is 1, then masking $Z(n-1:m)$.

2. The method of claim 1 wherein the step of determining if any of the signals representing the bits in XL are 1 includes the step of performing the logical operation OR.

3. The method of claim 1 wherein the step of masking $Z(n-1:m)$ includes the step of setting all of the signals representing the bits in $Z(n-1:m)$ to 1.

4. The method of claim 1 wherein the step of determining if a signal representing a first 1 exists in XL includes the step of performing the logical operation OR.

5. The method of claim 1 wherein the length of XL is equal to the length of XH.

6. The method of claim 1 wherein m=8 and n is a multiple of 8.

7. An automated machine implemented method for creating signals representing an output vector $Z(n-1:0)$ from signals representing a first vector $X(n-1:0)$ and signals representing a second vector $Y(n-1:0)$, the second vector $Y(n-1:0)$ being a complement of the first vector $X(n-1:0)$, n being a positive integer, the first vector $X(n-1:0)$ being dividable into subvectors of length j, where j equals n divided by 2, comprising:

(a) coupling the signal representing $Y(0)$ to $Z(0)$;

(b) inputting the signals representing $X(k-1:0)$ and $Y(k)$ to a first group of logical OR functions, where k equals 1 to j–1, and coupling the signals output by the first logical OR functions to $Z(k)$;

(c) creating a signal representing an intermediate vector $I(j-1:0)$, the step of creating $I(j-1:0)$ including:

(i) coupling the signal representing $Y(j)$ to $I(0)$;

(ii) inputting the signals representing $X(j+k-1:j)$ and $Y(j+k)$ to a second group of logical OR functions, where k equals 1 to j–1, and coupling the signals output by the second logical OR functions to $I(k)$;

(d) inputting the signals representing each of the bits of $X(j-1:0)$ to a third logical OR function, the signal output by the third logical OR function being referred to as an intermediate result,; and (e) inputting the signal representing the intermediate result and the signals representing the intermediate vector $I(j-1:0)$ to a fourth logical OR function, and coupling the signals output by the fourth logical OR function to $Z(n-1:j)$.

8. The method for creating a signal representing an output vector $Z(n-1:0)$ of claim 7, wherein the first vector $X(n-1:0)$ is a subvector of a larger vector having a length greater than n.

9. The method for creating a signal representing an output vector $Z(n-1:0)$ of claim 7, wherein the first vector $X(n-1:0)$ is a subvector of a larger vector having a length equal to a positive integer greater than 2 multiplied by j.

10. An automated machine implemented method for generating a plurality of signals representing an output vector having a plurality of bits that identifies the first bit set to a logical 1 in a plurality of signals representing an input vector, the method comprising:

subdividing the input vector into signals representing first and second subvectors;

inputting the signals representing the first subvector to a first logic circuit adapted to identify the lowest order bit in the first subvector that is set to logical 1;

in response to the first logic circuit output, setting an output vector bit that corresponds to the first subvector bit identified by the first logic circuit to a first logic level, and setting all other bits in the output vector that correspond to the first subvector to a second logic level;

inputting the signals representing the first subvector to a second logic circuit adapted to identify whether any first subvector bits are set to a logical 1; and in response to the second logic circuit output, if any first subvector bits are set to logical 1, setting all of the bits in the output vector corresponding to the second subvector to the second logic level.

11. The method of claim 10, further comprising setting all of the output vector bits that correspond to the first subvector to the second logic level if the first subvector does not include any bits set to logical 1.

12. The method of claim 10, further comprising inputting signals representing the complement of the first subvector to the first logic circuit.

13. The method of claim 10, further comprising inputting the signals representing the second subvector to a third logic circuit adapted to identify the lowest order bit in the second subvector that is set to logical 1.

14. The method of claim 13, further comprising inputting the output of the second and third logic circuits to a fourth logic circuit to set all of the bits in the output vector corresponding to the second subvector to the second logic level if any first subvector bits are set to logical 1.

15. The method of claim 13, further comprising setting an output vector bit that corresponds to the second subvector bit identified by the third logic circuit to the first logic level, and setting all other bits in the output vector that correspond to the second subvector to a second logic level, if the first subvector does not include any bits set to logical 1.

16. The method of claim 10, wherein inputting the signals representing the first subvector to the second logic circuit adapted to identify whether any first subvector bits are set to a logical 1 includes performing the logical function OR.

17. A device for identifying the first logic 1 in an input vector having a plurality of bits, the input vector separable into first and second subvectors, the device comprising:

a plurality of output bits representing an output vector, each output bit corresponding to one input vector bit;

a first-level circuit having a plurality of input terminals to receive the input vector bits, a first group of output terminals to receive the output bits corresponding to the first subvector, and a second group of output terminals, wherein the first-level circuit outputs a first logic level at the output terminal of the first group that corresponds to the lowest order first subvector bit set to logic 1, and a second logic level is output at all other first group output terminals; and a second-level circuit having a plurality of input terminals coupled to the second group of output terminals, the second-level circuit having a plurality of output terminals to receive the output bits corresponding to the second subvector, wherein the second-level circuit outputs the second logic level at each of the second group of output bits if the first subvector includes a logic 1.

18. The device of claim 17 wherein if the first subvector does not include a logic 1, the second-level circuit outputs the first logic level at the output terminal that corresponds to the lowest order second subvector bit set to logic 1, and the second logic level is output at all other second-level output terminals.

19. The device of claim 17 wherein the first-level circuit comprises:

a first logic circuit having a plurality of input terminals to receive the first subvector bits, the first logic circuit having the first group of output terminals, wherein the first logic circuit is configured to output the first logic level at the output terminal corresponding to the lowest order bit of the first subvector set to logic 1, and output the second logic level at all other output terminals, and if no first subvector bit is set to logic 1, then output the second logic level at all output terminals;

a second logic circuit having a plurality of input terminals to receive the first subvector bits, the second logic circuit having an output terminal functioning as one of the second group of output terminals, wherein the second logic circuit is configured to perform a logical OR function; and a third logic circuit having a plurality of input terminals to receive the second subvector bits, the third logic circuit having a plurality of output terminals functioning as the remaining second group output terminals, each output terminal corresponding to one of the second subvector bits, wherein the third logic circuit is configured to output the first logic level at the output terminal corresponding to the lowest order bit of the second subvector set to logic 1, and output the second logic level at all other output terminals.

20. The device of claim 19 wherein the second-level circuit comprises a fourth logic circuit having a plurality of input terminals coupled to the second group of output terminals, the fourth logic circuit having a plurality of output terminals to receive the output bits corresponding to the second subvector, wherein the fourth logic circuit is configured to perform a logical OR function.

21. A two level circuit for finding the first one (FF1) in a vector comprising a plurality of bits, each bit set to one of a logic 0 or a logic 1, the vector being dividable into first and second subvectors, comprising:

first and second FF1 circuits having input terminals to receive the bits of the first and second subvectors, respectively, and output terminals corresponding to the inputs;

an OR gate having input terminals to receive each bit of the first subvector, the OR gate providing a mask output at an output terminal; and an OR circuit comprising a plurality of OR gates, each OR gate of the OR circuit having a first input terminal to receive the mask output and a second input terminal coupled to one of the second FF1 output terminals, each OR gate of the OR circuit further having an output terminal.

22. The two level circuit of claim 21, wherein the FF1 circuits further include input terminals to receive the complement of the respective subvector.

23. A two level circuit for finding the first one (FF1) in a vector comprising a plurality of bits, each bit set to one of a logic 0 or a logic 1, the vector being divided into N subvectors, N being a positive integer, comprising:

N FF1 circuits, each FF1 circuit having input terminals to receive the bits of a corresponding subvector, each FF1 circuit having output terminals corresponding to the inputs;

N−1 first level logic OR gates corresponding to the N−1 lower-order subvectors, each OR gate having input terminals to receive each bit of the corresponding subvector, each OR gate outputting a mask output; and N−1 second level logic OR circuits corresponding to the N−1 higher-order FF1 circuits, each logic OR circuit comprising a plurality of OR gates having at least one input terminal coupled to the mask output of any lower-order first level logic OR gates, and a plurality of input terminals coupled to the outputs of the corresponding FF1 circuit, the second level logic OR circuits each having output terminals corresponding to the corresponding FF1 circuit.

24. The two level circuit of claim 23, wherein the FF1 circuits further include input terminals to receive the complement of the respective subvector.

25. A computer-readable medium storing instructions that when executed by a computer perform a method of generating an output vector that identifies the first logical 1 in an input vector comprising:

subdividing the input vector into signals representing a lower-order subvector and a higher-order subvector;

if a first 1 exists in a position in the lower-order subvector, then setting the corresponding position in the output vector to a first logic level, and setting all other output positions corresponding to the lower-order subvector to a second logic level;

if any position in the lower order subvector is a 1, then masking the positions in the output vector corresponding to the higher-order subvector.

26. The computer-readable medium of claim 25, storing instructions that when executed by a computer perform the method further comprising:

setting the signals representing all bits in the output vector corresponding to the lower-order subvector to the second logic level if a first 1 does not exist in the lower-order subvector.

* * * * *